Sept. 13, 1932.　　　　W. H. INGERSOLL　　　　1,877,327
TEMPERATURE CONTROL APPARATUS
Filed July 6, 1931　　2 Sheets-Sheet 2
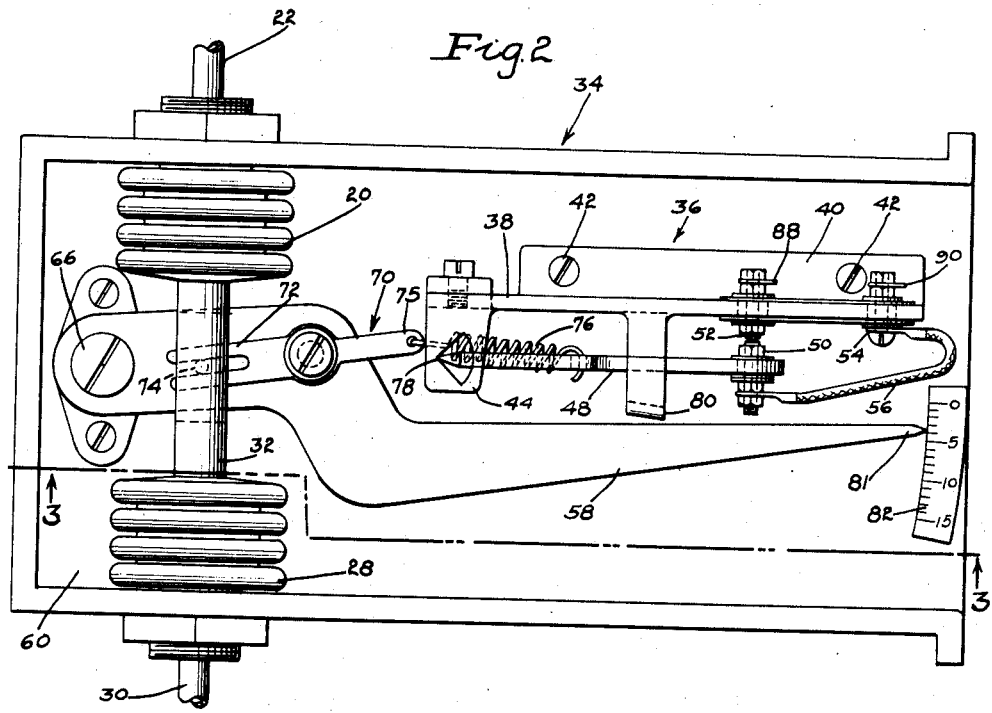
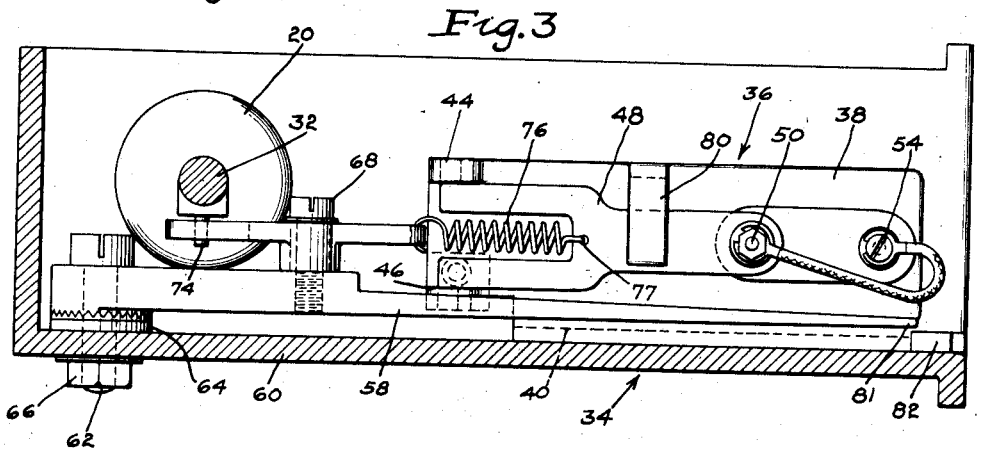
INVENTOR
WARD H. INGERSOLL
ATTORNEYS Patented Sept. 13, 1932

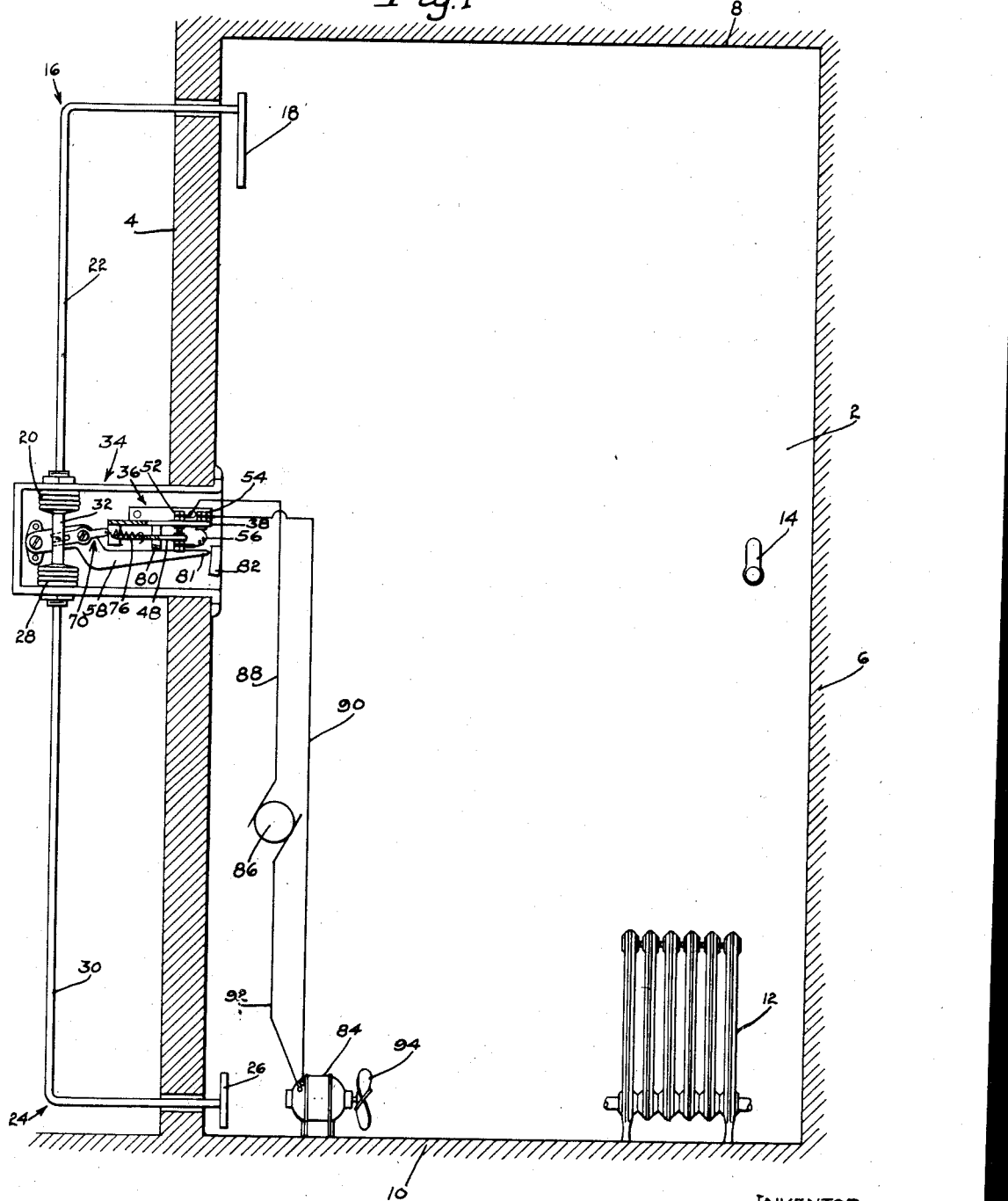

1,877,327

UNITED STATES PATENT OFFICE

WARD H. INGERSOLL, OF ST. PAUL, MINNESOTA, ASSIGNOR TO MINNEAPOLIS-HONEY-WELL REGULATOR COMPANY, OF MINNEAPOLIS, MINNESOTA, A CORPORATION OF DELAWARE

TEMPERATURE CONTROL APPARATUS

Application filed July 6, 1931. Serial No. 548,753.

This invention relates generally to devices for controlling the temperature of an enclosed or substantially enclosed room or space. More particularly it concerns itself with the provision of a control apparatus for preventing stratification of air within a room or space into layers or regions having appreciable temperature differences. The invention further relates to the combination of such means with the usual room thermostat operated means for controlling the operation of a heater or the like for supplying heat.

If a room provided with a steam radiator or the like becomes cold and the radiator is turned on, convection currents will be set up as soon as the radiator begins to supply heat. The relatively hot air surrounding the radiator will rise and replace the relatively cold air at the top which is of greater density. The cold air moving down is then also heated by the radiator whereupon it rises and a continuous circulation is set up. This circulation produces a fairly uniform temperature throughout the room and when it reaches a point comfortable to the occupants the supply of heating medium to the radiator is cut off. After the radiator gives up the remainder of its heat to the air within the room, the circulation induced by it will cease and in time the temperature of the air at or near the ceiling of the room will be appreciably higher than that at the floor. At a level midway between the two a temperature may exist which would be comfortable to room occupants but they will nevertheless have a feeling of coldness because of the relatively low temperature of the air surrounding the lower portions of their bodies. Under such circumstances the natural inclination of the occupants is to turn on the radiator so that additional heat will be supplied to the room and while this will have the effect of bringing the lower portions of the room up to the desired temperature, it may nevertheless result in an excess temperature in the upper portions of the room and possibly even at the breathing level of the occupants, thereby making the room uncomfortable for them because of the excess heat.

Where the operation of the radiator is controlled by a room thermostat, which is ordinarily positioned at the breathing level of the occupants, the arising of a stratified condition under which the temperature adjacent the floor is too low for comfort and the temperature adjacent the ceiling is higher than the desired temperature, will not result in an actuation of the thermostat to turn on the radiator or to supply more heat provided the air temperature at the level of the thermostat is at the desired point. As a consequence the room thermostat alone may not be sufficient to control the room temperature to a condition which would be desirable or comfortable to occupants, and in order to overcome this disadvantage it has been proposed to provide the heating plant with devices for automatically maintaining any given part of the plant at or above a predetermined minimum temperature.

Such automatic control devices may be mounted on the boiler, the main riser, the radiator itself, or any other suitable point in the system. The basic idea underlying their use is that of maintaining the heater at or above a minimum temperature at which it is capable of inducing a circulation within the room or space being heated whenever the temperature of the lower strata falls to a point at which it would become uncomfortable. For example, the radiator in a room could be held at a minimum temperature of 90° F. and thereby always possess sufficient heat to break up any stratification by inducing a circulation. Such a control system has the disadvantage that it is necessary to expend great amounts of heat in order to maintain a circulation sufficient to overcome undesirable conditions of stratification, and it is moreover difficult to obtain a sensitive and accurate temperature control.

It is a general object of this invention to provide means for agitating the air and comingling the same whenever an undesirable condition of stratification exists, thereby to break the strata and make the room temperature uniform. More specifically, the invention contemplates the provision of such means in combination with room thermostat operated means for controlling a heater. Among the advantages resulting from such combination are the obtaining of a more accurate temperature control and a saving in fuel for the heating plant. If it be assumed, for example, that a condition exists wherein the temperature at the level of the room thermostat is at the desired uniform room temperature but wherein the temperature near the ceiling is above whereas that near the floor is below desired uniform temperature, it is possible that the agitation of the entire mass of air so that the upper warm strata is comingled with the lower relatively cold strata will result in a uniform room temperature which is at the desired point. Thus, such temperature could be obtained without the addition of heat from the heating plant and the uniformity would make for greatest possible comfort to the occupants.

According to the invention the room whose temperature is being controlled is provided with a fan or other circulating or agitating means for the air. The fan is controlled by means of two thermostats, one of which is movable in response to changes in the temperature of the air in the portion of the room adjacent the ceiling and the other of which is movable in response to changes in the air temperature adjacent the floor. These thermostats are arranged and connected to oppose one another so that there will be no relative movement between the two when the upper and lower portions of the room are at substantially like temperatures and under which condition there would be no undesirable stratification of the air. When there is an appreciable difference between the temperatures at the top and the bottom of the room, however, an undesirable stratification will be existent and the thermostat movable in response to temperature changes at the top will overcome its cooperating thermostat and move an amount proportional to the difference between the temperatures at the top and bottom of the room. Means are provided for energizing a motor for the fan when the upper thermostat thus moves a predetermined amount.

The movement of the fan will serve to agitate the air within the room and make its temperature substantially uniform whereupon the thermostat movable in response to temperature changes at the bottom will again exert a force equal and opposite to that of the upper thermostat. Means are provided for de-energizing the fan motor under such a condition.

The apparatus will thus automatically function to circulate and agitate the air within the room to bring it to a uniform temperature whenever any selected difference in temperature between that at the top and that at the bottom of the room arises. If the room is also provided with the usual room thermostat located at the breathing level of the occupants, the temperature conditions within the room will always be comfortable. If the room thermostat is at desired uniform temperature and the floor portion is relatively cold, the fan will be brought into operation to create a uniform temperature and if this temperature is below that for which the thermostat is set, the thermostat will operate to cause the radiator to supply additional heat.

The various features of the invention will become more readily apparent upon a study of the embodiment of the invention illustrated in the drawings wherein Fig. 1 shows a cross-section through a room provided with a temperature control apparatus in accordance with this invention;

Fig. 2 is an enlarged side elevation of the operating mechanism of the snap-action switch for the fan motor; and Fig. 3 is a cross-section along the line 3—3 of Fig. 2.

Referring more particularly to the drawings, the numeral 2 designates a room which is to be heated and which is defined by walls 4 and 6, a ceiling 8, and a floor 10. Within the room is a heating unit such as a radiator 12 which is controlled by means of a room thermostat 14 in any desired manner. Preferably the control of the radiator is so arranged that it is cut off from its supply of heating medium when a room thermostat 14 is at or above a given temperature, for instance, 70 degrees, and is connected to a source of heating medium when the temperature of the room thermostat falls below 70 degrees.

A thermostat generally designated at 16 is provided with a heat sensitive part comprising a capsule 18 containing volatile fluid, and with bellows 20. The capsule 18 and the bellows 20 are connected by means of a fluid conduit 22. As the temperature of the volatile fluid within capsule 18 increases its pressure will increase and the bellows 20 will expand but upon a decrease in the temperature of the capsule the pressure of the fluid will decrease and the bellows will contract. A similar thermostat generally designated at 24 is provided with a heat sensitive part comprising a capsule 26 and is further provided with bellows 28. Connecting the capsule 26 and bellows 28 is a fluid conduit 30.

The bellows 28 and 20 are connected by means of a rigid member 32 so that the force exerted by each of the bellows opposes that of the other. Thus when the pressure within conduits 22 and 30 is the same, bellows 20 and 28 will exert equal and opposite forces upon the connecting member 32 so that this member will remain motionless. But when a difference between the pressures in the pipes 22 and 30 occurs, the bellows will exert unequal forces and the connecting member 32 will move in the direction governed by the bellows having the greater force. Since the pressures within pipes 22 and 30 vary with the temperatures of capsules 18 and 26, respectively, the connecting member 32 will only have its position changed upon the occurrence of a difference in the temperature of the capsule 18 as compared to the capsule 26. Uniform temperature change within the room will thus not effect a change of position on the part of member 32.

The bellows 28 and 20, and their connecting member 32 are mounted within a housing 34 fitted into an opening in the wall 4 in any convenient manner. Housing 34 contains a bracket generally designated at 36 which comprises the mounting for a snap-action switch. The bracket 36 has a flat horizontal portion 38 provided with a portion 40 bent at right angles thereto and which is secured to a wall of the housing by means of screws 42. The horizontal portion 38 is provided with a pair of depending lugs 44 and 46 at one end thereof and which are provided with holes serving as bearings for the bent ends of a bifurcated switch arm 48 carrying a contact 50 for engagement with the contact 52 which is carried by the horizontal portion 38 of the bracket. The bracket also carries a contact 54 which is electrically connected to contact 50 by means of a wire 56.

An arm 58 is secured at one end to the wall 60 of the housing 34 by means of a bolt 62 as shown in Fig. 3. The arm 58 is preferably provided with a serrated surface cooperating with a serrated washer 64 which may be fixed to the wall 60 of the housing in any convenient manner. It will be seen that the position of arm 58 may be adjusted by loosening the nut 66 and moving the arm about the stem of the bolt 62 as a pivot. When nut 66 is tightened, the arm will be held in fixed position.

Pivoted to the arm 58 by means of a bolt 68 is a lever 70 having a slotted end 72 engaged by a pin 74 fixed to the connecting member 32. Upon movement of the connecting member 32 the lever 70 will be rocked about the bolt 68.

The end 75 of lever 70 is connected to a spring 76 which spring is connected at its other end to the switch arm 48 at 77. When the end 75 of lever 70 is above the center of the bearings in the lugs 44 as shown in Fig. 2, the spring 76 will serve to hold arm 48 in an upper position so that contact 50 is in engagement with contact 52 but as the end 75 moves down below the pivot point 78, the arm 48 is rapidly drawn in downward direction with a snap action so that contacts 50 and 52 are separated. The downward movement of arm 48 is limited by a stop 80.

By varying the position of the arm 58 it will be seen that the position which member 32 and pin 74 occupy when the contacts 50 and 52 make and break may be varied. If, for example, nut 66 is loosened and the arm 58 is moved downwardly from the position shown in Fig. 2, the contacts 50 and 52 will separate even though the connecting member 32 remains stationary. For convenience in effecting settings of the arm 58 it is preferably provided with a pointed end 81 cooperating with the scale 82.

The parts are so arranged that the contacts 52 and 50 will be opened and closed upon movement of the connecting member 32 due to differences in the pressures of the volatile fluids in the thermostats 16 and 24. The contacts 52 and 50 are in the following energizing circuit of a fan motor 84: source of electricity 86, wire 88, contact 52, contact 50, wire 56, contact 54, wire 90, fan motor 84, wire 92 and source of electricity 86.

When the installation has been made, the arm 58 is so adjusted that the contacts 50 and 52 of the snap-action switch will remain separated when the capsules 18 and 26 are both at the same temperature. With the parts as shown in Fig. 1, capsule 18 is at a higher temperature than capsule 26, bellows 20 having exerted a greater force than bellows 28 so that connecting member 32 was moved downwardly carrying with it its pin 74. The downward movement of pin 74 caused a rocking of the pivoted lever 70 with the result that its end 75 was raised above the pivot point 78 of the switch arm 48. As a consequence, the contacts 50 and 52 are in engagement. When the temperature within the room equalizes, the pressure in conduit 30 will equal that in conduit 22 and connecting member 32 will move upwardly whereupon the end 75 of lever 70 will be rocked downwardly below the pivot point 78 and contacts 50 and 52 will be separated.

It will of course be understood that the movement of connecting member 32 is proportional to the difference in pressure existing in conduits 22 and 30 and is accordingly proportional to the difference between the temperatures of capsules 18 and 26. Accordingly the position of arm 58 determines the necessary temperature difference between capsules 18 and 26 which is required to close the switch.

Assuming that arm 58 has been so adjusted that contacts 50 and 52 will only close when capsule 18 is 10 degrees hotter than capsule 26, the operation will be as follows: As long as the room temperature remains uniform the contacts 50 and 52 will remain separated and the fan motor 84 will remain de-energized. If a condition arises under which the air within room 2 stratifies so that capsule 18 becomes 10 or more degrees hotter than capsule 26, contacts 50 and 52 will close, fan motor 84 will be energized, and the fan 94 will circulate air throughout the room thereby breaking up the stratified layers and making the room temperature uniform.

Where the temperature of the room is being controlled by means of a room thermostat it often happens that after a prolonged period of operation with the radiator turned off, a condition will be set up within the room wherein the temperature of the air at about the breathing level of the occupants, at which height the room thermostat is usually mounted, will be at 70 degrees whereas the temperature of the air at the floor may be as low as 65 degrees. The temperature at the ceiling under such circumstances may be as high as 75 degrees. Under such conditions the room thermostat, if set for 70 degrees, will not act to send additional heat to the radiator but the occupants will nevertheless have a feeling of coldness because of the low temperature adjacent the floor. However, when such a condition arises the thermostats 16 and 24 will automatically act to close the energizing circuit for motor 84 whereupon the fan 94 will circulate the air around the room and make the temperature uniform. If the resulting room temperature is above 70 degrees, the room thermostat will not have acted to supply more heat and the occupants of the room will be comfortable. On the other hand, if the resulting uniform room temperature is below 70 degrees the thermostat will operate to send additional heat to the radiator and the temperature of the room will be raised to the desired point.

It will be understood that the thermostats 16 and 24 may be arranged to set the fan in operation upon the existence of any desired difference between the temperature of the air at or near the ceiling and that at or near the floor, and it will be seen that in this way undesirable stratification is avoided without the necessity of dissipating an undue amount of heat from the radiator and that comfortable conditions are maintained in the room at all times.

I claim as my invention:

1. In an apparatus for controlling the temperature of air in a room or space being heated, a member operative in response to changes in the temperature of the air in the upper portion of the room or space being heated, a second member operative in response to changes in the temperature of the air in the lower portion of said room or space, and means associated with said members for agitating the air in said room or space when it stratifies into an upper heated region and a lower relatively cold region, thereby to render the temperature of said air uniform.

2. In an apparatus for controlling the temperature of air in a room, a first thermostat having a heat sensitive part within said room adjacent its ceiling, a second thermostat having a heat sensitive part within the room adjacent the floor thereof, and means associated with said thermostats for agitating the air within said room when there is a predetermined difference between the temperatures of the said heat sensitive parts of the first and second thermostats.

3. In an apparatus for controlling the temperature of the air in a room or space being heated, electrically operated means for agitating said air, and means responsive to a difference in the temperature between a higher temperature in the upper portion of the room or space and a relatively lower temperature in its lower portion for energizing said agitating means, thereby to render the temperature of the air uniform.

4. In an apparatus for controlling the temperature of a room or space being heated, a first thermostat movable in response to changes in the temperature of the air at the uppermost portion of said room or space, a second thermostat movable in response to changes in the temperature of the air at its lowermost portion, means connecting said thermostats for causing the movement of one to oppose that of the other, and means controlled by said thermostats for agitating said air.

5. In an apparatus for controlling the temperature of the air in a room or space, a first thermostat movable in response to changes in the temperature of the air at the uppermost portion of said room or space, a second thermostat movable in response to changes in the temperature of the air at the lowermost portion of said room or space, means connecting said thermostats for causing the movement of one to oppose that of the other, and means controlled by the thermostats for agitating said air, said thermostats being arranged to hold said agitating means inoperative when the temperature of the air at the uppermost portion of the room or space is substantially the same as that at the lowermost portion.

6. An apparatus for controlling the temperature of the air in a room or space being heated, comprising a heater, a first thermostat movable in response to changes in the temperature of the air in the uppermost portion of said room or space, a second thermostat movable in response to changes in the temperature of the air in the lowermost portion of the room or space, a third thermostat controlling the operation of said heater, and means controlled by the first and second thermostats for agitating said air.

7. An apparatus for controlling the temperature of the air in a room or space, comprising a heater, a first thermostat having its heat sensitive part positioned adjacent the uppermost portion of said room or space, a second thermostat having its heat sensitive part positioned adjacent the lowermost portion of said room or space, a third thermostat positioned within said room at an elevation between said first and second thermostats, means associated with said third thermostat for controlling said heater, and means controlled by the first and second thermostats for agitating said air, said first and second thermostats being arranged to hold the agitating means inoperative when their heat sensitive parts are at substantially the same temperature.

8. An apparatus for maintaining uniform temperature conditions within the air in a room having a ceiling, walls, and a floor, comprising a first fluid pressure thermostat having its heat sensitive part exposed to the air within the room at a point adjacent its ceiling and having a portion movable with changes in the pressure of its fluid located outside of said room, a second fluid pressure thermostat having its heat sensitive part within said room adjacent the floor and its part movable with changes in the pressure of its fluid also located outside said room, means connecting the movable parts of said thermostats for causing one to oppose the other, and means controlled by said thermostats for agitating the air within the room when the temperature adjacent the ceiling is appreciably higher than that adjacent the floor.

9. An apparatus for maintaining uniform temperature conditions in a room having a ceiling and a floor, comprising a first fluid pressure thermostat having a capsule within the room adjacent the ceiling and bellows located outside of the room, a second fluid pressure thermostat having a capsule within the room adjacent the floor and bellows positioned outside the room, means connecting the bellows of said thermostats for causing one to oppose the other thereby to prevent relative movement between the two when their capsules are at like temperatures, an electric motor operated fan for agitating the air within the room, and means associated with said thermostats for energizing the fan motor when the capsule of the first thermostat is at a temperature appreciably greater than the capsule of the second thermostat, and for maintaining said fan motor deenergized when the said capsules are at substantially like temperatures and when the capsule of the second thermostat is at a higher temperature than that of the first.

10. An apparatus for controlling the temperature of the air within a room or space, comprising a first fluid pressure thermostat having a capsule within the room or space adjacent its uppermost portion and having bellows outside the same, a second fluid pressure thermostat having a capsule within the room or space adjacent its lowermost portion and bellows outside of same, a heater, a third thermostat positioned at an elevation between the capsules of the first and second thermostats and controlling the operation of said heater, means connecting the bellows of the first and second thermostats for causing one to oppose the other, a fan, an electric motor for the fan, an energizing circuit for said motor, and means associated with said bellows for opening and closing the energizing circuit of said fan motor.

11. In an apparatus for controlling the temperature of the air in a room or space, a first thermostat movable in response to changes in the temperature of the air in the upper portion of said room or space, a second thermostat movable in response to changes in the temperature of the air in the lower portion of said room or space, electrically operated means for agitating said air, an energizing circuit for said agitating means, a snap-action switch in said circuit, and means associated with said thermostats for opening and closing said switch.

In witness whereof, I have hereunto set my hand this 1st day of July, 1931.

WARD H. INGERSOLL.